(12) United States Patent
Fleischmann et al.

(10) Patent No.: US 8,994,652 B2
(45) Date of Patent: Mar. 31, 2015

(54) MODEL-BASED MULTI-HYPOTHESIS TARGET TRACKER

(71) Applicants: Omek Interactive, Ltd., Bet Shemesh (IL); Intel Corporation, Santa Clara, CA (US)

(72) Inventors: Shahar Fleischmann, Hod Hasharon (IL); Yotam Livny, Gedera (IL); Gideon Kleimer, Holon (IL); Gershom Kutliroff, Alon Shvut (IL)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 13/768,835

(22) Filed: Feb. 15, 2013

(65) Prior Publication Data

US 2014/0232631 A1 Aug. 21, 2014

(51) Int. Cl.
*G09G 5/00* (2006.01)
*G06F 3/01* (2006.01)

(52) U.S. Cl.
CPC ..................................... *G06F 3/017* (2013.01)
USPC .......................................................... 345/156

(58) Field of Classification Search
CPC .................... G06F 3/005; G06F 3/011–3/014; G06F 3/017
USPC .......................................................... 345/156
See application file for complete search history.

(56) References Cited

U.S. PATENT DOCUMENTS

| 6,104,379 | A | * | 8/2000 | Petrich et al. ................. 345/157 |
| 7,538,744 | B1 | * | 5/2009 | Liu et al. ............................ 345/7 |
| 2004/0190776 | A1 | * | 9/2004 | Higaki et al. ................. 382/190 |
| 2009/0103780 | A1 | * | 4/2009 | Nishihara et al. ............. 382/103 |
| 2011/0085705 | A1 | | 4/2011 | Izadi et al. |
| 2011/0317871 | A1 | | 12/2011 | Tossell et al. |
| 2012/0069168 | A1 | * | 3/2012 | Huang et al. ..................... 348/77 |
| 2012/0277594 | A1 | * | 11/2012 | Pryor ............................. 600/476 |
| 2012/0303839 | A1 | * | 11/2012 | Jackson et al. .................. 710/15 |
| 2012/0309532 | A1 | | 12/2012 | Ambrus et al. |
| 2012/0313955 | A1 | * | 12/2012 | Choukroun ................... 345/582 |
| 2012/0326963 | A1 | | 12/2012 | Minnen |

FOREIGN PATENT DOCUMENTS

EP 2538305 12/2012

OTHER PUBLICATIONS

PCT Search Report and Written Opinion, PCT/US2014/013618, May 14, 2014 11 pages.

* cited by examiner

*Primary Examiner* — Stephen Sherman
(74) *Attorney, Agent, or Firm* — Blakely, Sokoloff, Taylor & Zafman LLP

(57) ABSTRACT

The present disclosure describes a target tracker that evaluates frames of data of one or more targets, such as a body part, body, and/or object, acquired by a depth camera. Positions of the joints of the target(s) in the previous frame and the data from a current frame are used to determine the positions of the joints of the target(s) in the current frame. To perform this task, the tracker proposes several hypotheses and then evaluates the data to validate the respective hypotheses. The hypothesis that best fits the data generated by the depth camera is selected, and the joints of the target(s) are mapped accordingly.

25 Claims, 17 Drawing Sheets

MODEL-BASED MULTI-HYPOTHESIS TARGET TRACKER

BACKGROUND

To a large extent, humans' interactions with electronic devices, such as computers, tablets, and mobile phones, require physically manipulating controls, pressing buttons, or touching screens. For example, users interact with computers via input devices, such as a keyboard and mouse. While a keyboard and mouse are effective for functions such as entering text and scrolling through documents, they are not effective for many other ways in which a user could interact with an electronic device. A user's hand holding a mouse is constrained to move only along flat two-dimensional (2D) surfaces, and navigating with a mouse through three dimensional virtual spaces is clumsy and non-intuitive. Similarly, the flat interface of a touch screen does not allow a user to convey any notion of depth. These devices restrict the full range of possible hand and finger movements to a limited subset of two dimensional movements that conform to the constraints of the technology.

A more natural and intuitive way to interact with electronic devices is by moving the hands and fingers freely in the space between the user and the device. To enable this interaction, it is necessary to robustly and accurately track, in real-time, the configuration of the user's hands and articulation of his fingers.

BRIEF DESCRIPTION OF THE DRAWINGS

FIG. 6A shows an upturned open hand with the fingers spread apart; FIG. 6B shows a hand with the index finger pointing outwards parallel to the thumb and the other fingers pulled toward the palm; FIG. 6C shows a hand with the thumb and middle finger forming a circle with the other fingers outstretched; FIG. 6D shows a hand with the thumb and index finger forming a circle and the other fingers outstretched; FIG. 6E shows an open hand with the fingers touching and pointing upward; and FIG. 6F shows the index finger and middle finger spread apart and pointing upwards with the ring finger and pinky finger curled toward the palm and the thumb touching the ring finger.

FIG. 7A shows a dynamic wave-like gesture; FIG. 7B shows a loosely-closed hand gesture; FIG. 7C shows a hand gesture with the thumb and forefinger touching; and FIG. 7D shows a dynamic swiping gesture.

DETAILED DESCRIPTION

Figure 1:
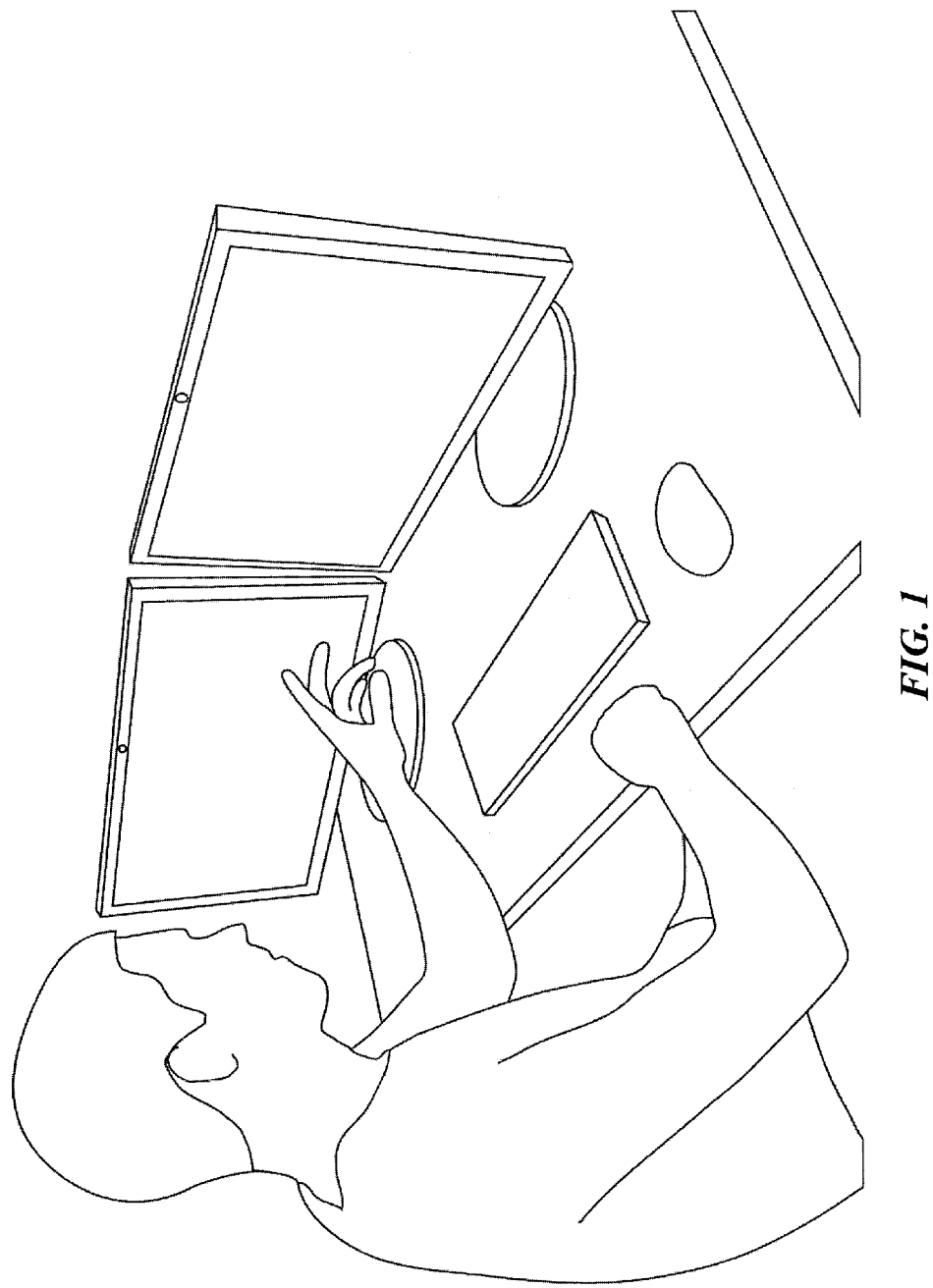
FIG. 1 is a diagram illustrating an example environment in which two cameras are positioned to view an area.

A system and method for tracking a user's hands and fingers in real-time is described. The method processes depth data acquired by a depth camera, and captured at high, interactive frame-rates, and implements specialized algorithms that compute the hand configurations and finger articulations (the "hand pose") for each frame of data. Once the movements and configurations of the user's hands are computed, they can be used to control a device, either by mapping the locations of the user's movements to a display screen, or by interpreting movements as specific gestures performed by the user. In particular, the user's hands and fingers can be visualized in some representation on a screen, such as a mouse cursor, and this representation of the user's hands and fingers can be manipulated to interact with other, virtual, objects that are also displayed on the screen. U.S. patent application Ser. No. 13/676,017, "System and Method for User Interaction and Control of Electronic Devices", and U.S. patent application Ser. No. 13/532,609, "System and Method for Close-Range Movement Tracking", describe such interactions, and are hereby incorporated in their entireties.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

A depth camera captures depth images—generally a sequence of successive depth images—at multiple frames per second. Each depth image contains per-pixel depth data, that is, each pixel in the image has a value that represents the distance between a corresponding area of an object in an imaged scene, and the camera. Depth cameras are sometimes referred to as three-dimensional (3D) cameras. A depth camera may contain a depth image sensor, an optical lens, and an illumination source, among other components. The depth image sensor may rely on one of several different sensor technologies. Among these sensor technologies are time-of-flight, known as "TOF", (including scanning TOF or array TOF), structured light, laser speckle pattern technology, stereoscopic cameras, active stereoscopic sensors, depth from focus technologies, and depth from shading technologies. Most of these techniques rely on active sensors, in the sense that they supply their own illumination source. In contrast, passive sensor techniques, such as stereoscopic cameras, do not supply their own illumination source, but depend instead on ambient environmental lighting. In addition to depth data, the cameras may also generate color data, in the same way that conventional color cameras do, and the color data may be combined with the depth data for processing.

The data generated by depth cameras has several advantages over that generated by conventional, two-dimensional "2D" cameras. In particular, the depth data greatly simplifies the problem of segmenting the background from objects in the foreground, is generally robust to changes in lighting conditions, and can be used effectively to interpret occlusions. Using depth cameras, it is possible to identify and track both the user's hands and his fingers in real-time.

U.S. patent application Ser. No. 13/441,271, entitled "System and Method for Enhanced Object Tracking", filed Apr. 6, 2012, describes a method of identifying and tracking a user's body part(s) using a combination of depth data and amplitude data from a time-of-flight (TOF) camera, and is hereby incorporated in its entirety in the present disclosure.

For the purposes of this disclosure, the term "gesture recognition" refers to a method for identifying specific movements or pose configurations performed by a user. For example, gesture recognition can refer to identifying a swipe of a hand in a particular direction having a particular speed, a finger tracing a specific shape on a touch screen, or the wave of a hand. Gesture recognition is accomplished by first tracking the depth data and identifying features, such as the joints, e.g., of the user's hands and fingers, and then, subsequently, analyzing this tracked data to identify gestures performed by the user.

The method described in the present disclosure computes the 3D positions and rotations of the joints of the user's hands. This data can subsequently be processed by a gesture recognition component, which decides whether the user has performed a specific gesture, or not. Whether through the tracked joint positions or the detection of specific gestures, knowledge of the user's hand configurations can be used to power a natural, intuitive user interaction paradigm.

For example, a user's natural, unrestricted hand and finger movements can be used to control a virtual environment. There are several advantages to such a user interaction mechanism over standard methods of user interaction and control of electronic devices, such as a mouse and keyboard and a touch screen. Firstly, the user does not have to extend his arm to touch a screen, which may cause fatigue and also blocks his view of the screen. Secondly, movements in 3D space provide more degrees of freedom. Thirdly, depending on the field-of-view of the camera, the user may have a larger interaction area in which to move around than just the screen itself.

For example, a user may swipe his hand towards the center of the monitor display to bring up a menu. Subsequently, he may use a finger to select items on the menu and swipe with his finger to launch the item. Alternatively, an opposite swipe, in the other direction, can close the menu. In another example, the user may select an icon or other object on the monitor display by pointing at it with his finger, and move it around the monitor by pointing his finger at different regions of the display. He may subsequently launch an application represented by the icon by opening his hand. Similarly, the user may select the display screen itself, instead of an icon or object. In this case, movements of the hand or finger may be mapped to scrolling of the display screen. Alternatively, he may close his hand, and thus close the application. In another example, the user may select an object on the monitor display and rotate it along one or more axes by mapping the rotations of his hand to the object. Furthermore, the user may rotate two objects in such a way simultaneously, one with each hand. We have presented several examples of user interactions that may be enabled with the solution described in the present disclosure. However, there are many more such interactions, and these examples should not be understood to be restrictive at all.

FIG. 1 is a diagram of a user interacting with two monitors at close-range. In one application, there may be a depth camera on each of the two monitors. In another application, there may be only a single monitor with a depth camera. The user is able to interact with the screens by moving his hands and fingers. The depth camera captures live video of his movements, and algorithms as described in the present disclosure are applied to interpret the movements and understand the user's intentions. Some form of feedback to the user is then displayed on the screens.

Figure 2:
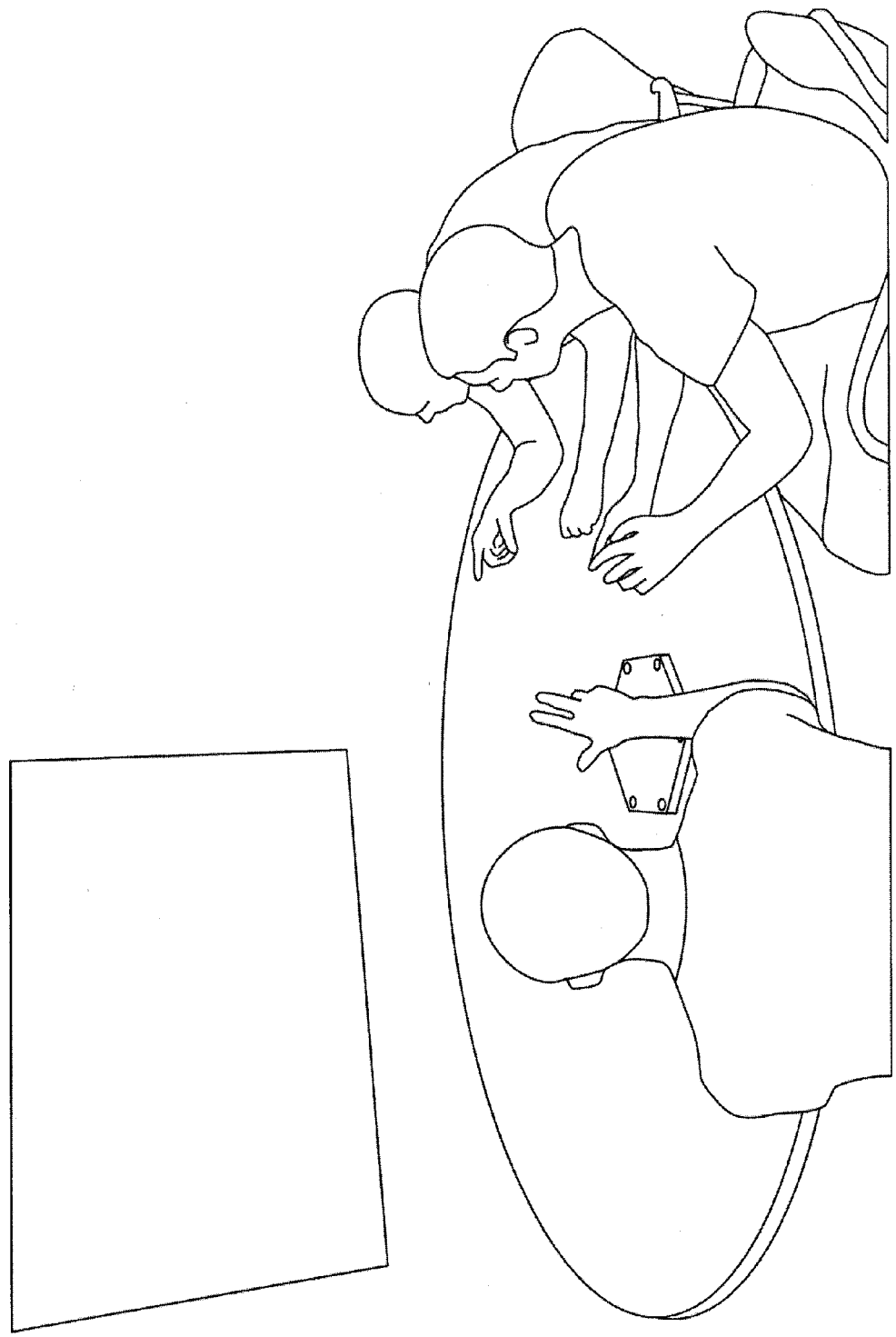
FIG. 2 is a diagram illustrating an example environment in which multiple cameras are used to capture user interactions.

FIG. 2 is a diagram of another application of the present disclosure. In this application, a standalone device can contain a single depth camera, or multiple depth cameras, positioned around the periphery of the device. Individuals can interact with their environment via the movements of their hands and fingers. The movements are detected by the camera and interpreted by the tracking algorithms.

Figure 3:
FIG. 3 is a diagram illustrating an example environment in which multiple cameras are used to capture interactions by multiple users.

FIG. 3 is a diagram of a further application of the present disclosure, in which multiple users interact simultaneously with an application designed to be part of an installation. In this embodiment as well, the movements of the users' hands and fingers control their virtual environment, via a depth camera that captures live video of their movements. Tracking algorithms interpret the video to identify their movements.

Figure 4:
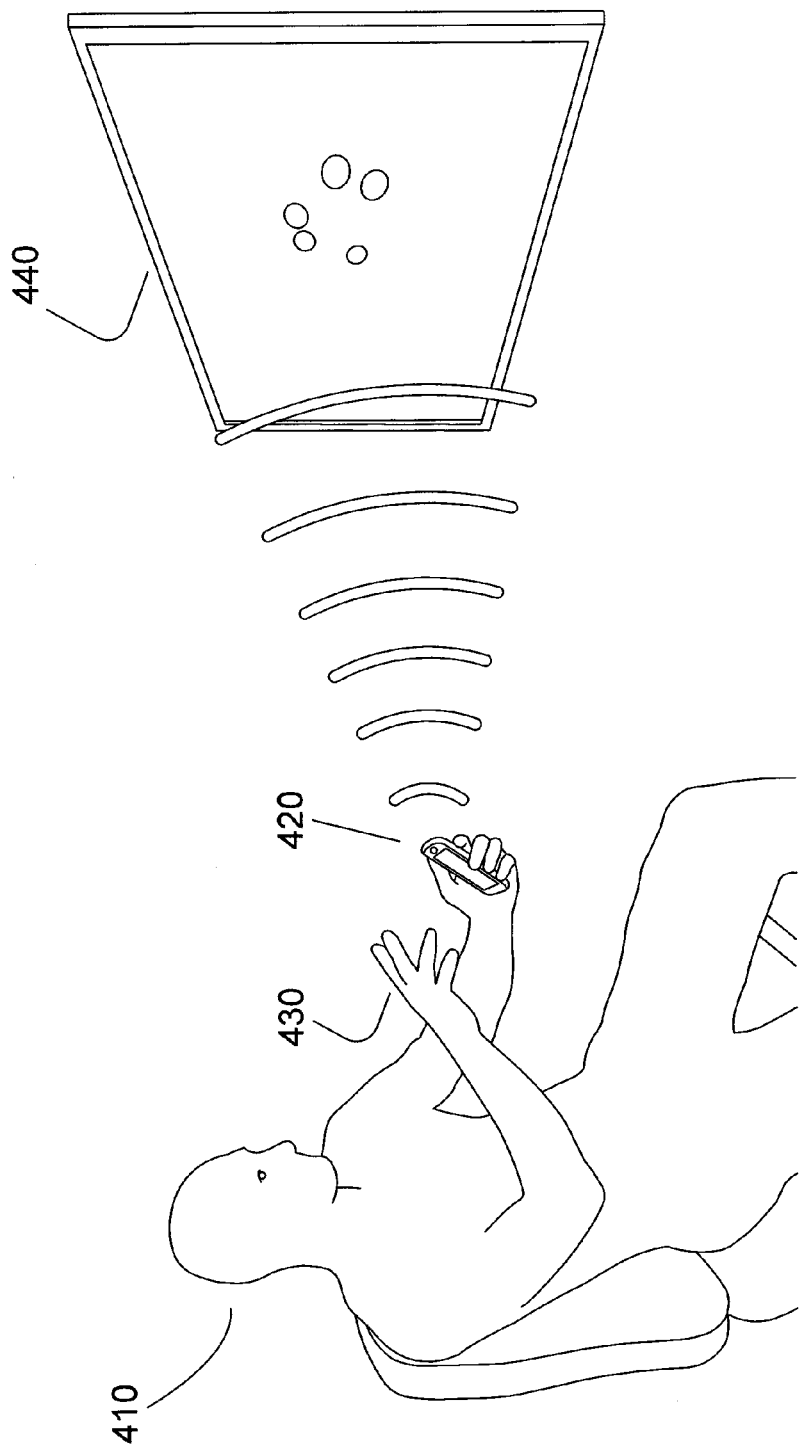
FIG. 4 is a schematic diagram illustrating control of a remote device through tracking of a user's hands and/or fingers.

FIG. 4 is a diagram of a still further application of the present disclosure, in which a user 410 moves his hands and fingers 430 while holding a handheld device 420 containing a depth camera. The depth camera captures live video of the movements, and tracking algorithms are run on the video to interpret his movements. Further processing translates the user's hand and/or finger movements into gestures, which are used to control the large screen 440 in front of the user.

Figure 5:
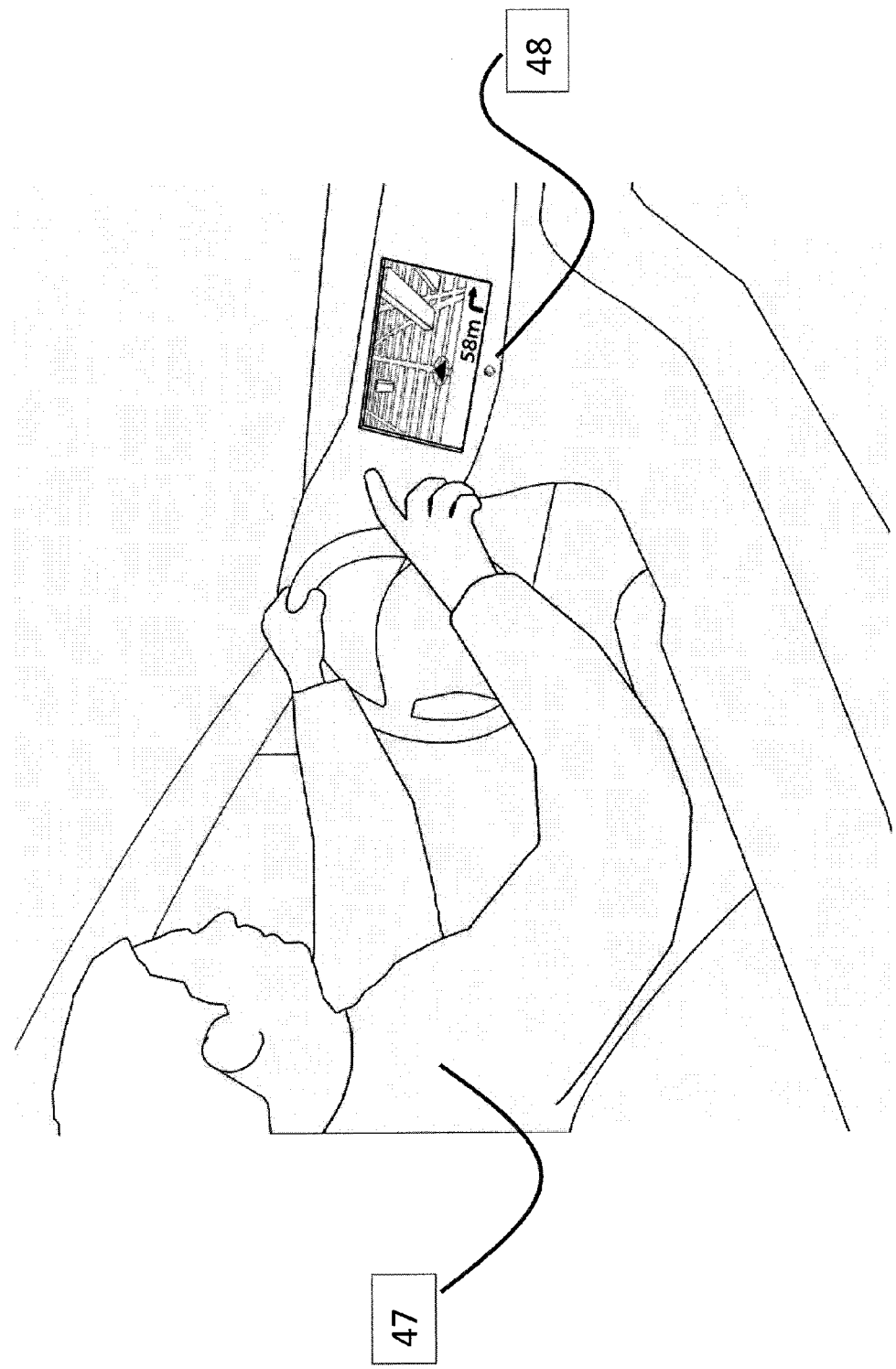
FIG. 5 is a diagram illustrating an example environment in which a user can interact with an automobile console using hand gestures.
Figure 6F:
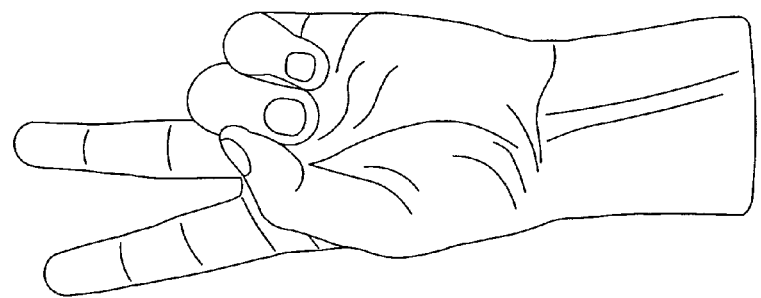
FIGS. 6A-6F show graphic illustrations of examples of hand gestures that may be tracked.
Figure 6D:
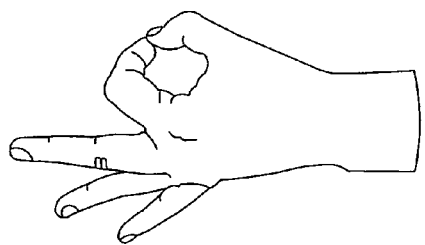
Figure 6E:
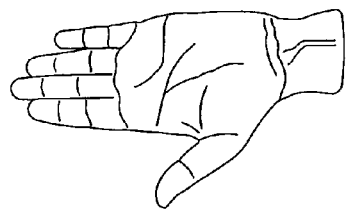
Figure 6A:
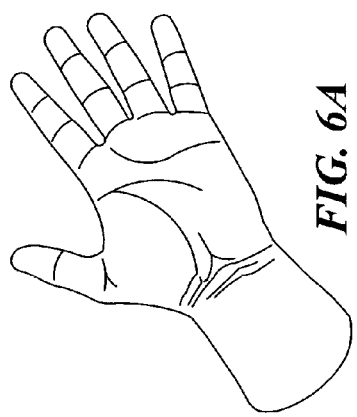
Figure 6B:
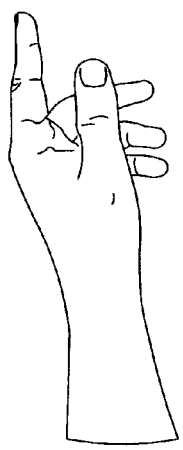
Figure 6C:
Figure 7A:
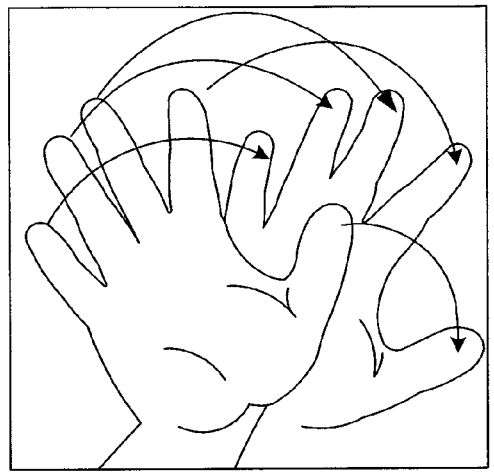
FIGS. 7A-7D show additional graphic illustrations of examples of hand gestures that may be tracked.
Figure 7B:
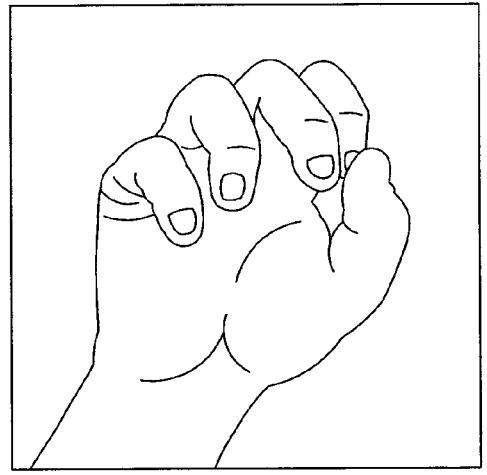
Figure 7C:
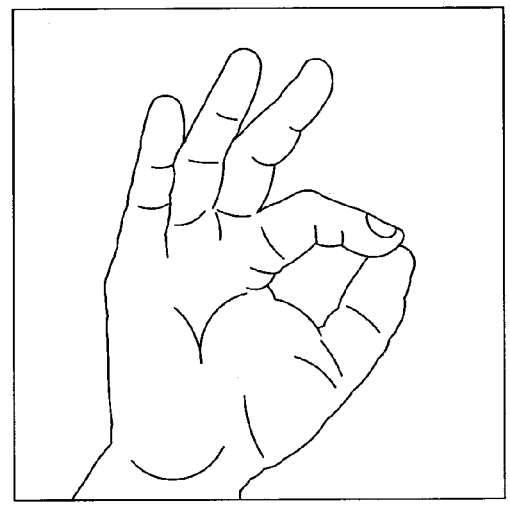
Figure 7D:
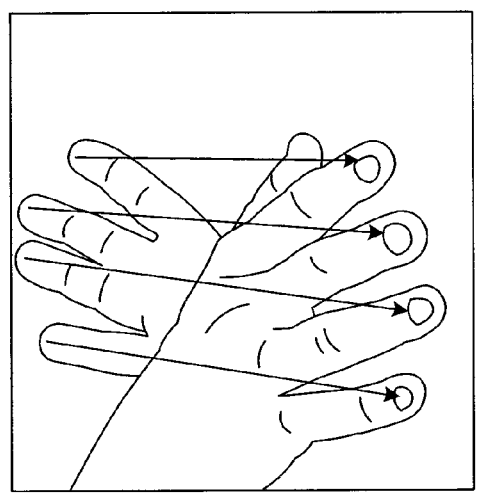

FIG. 5 is a diagram of a still further application of the present disclosure, in which a driver 47 of an automobile interacts with an in-car display via a depth camera 48 that is embedded in the car console. The driver (or a passenger) may perform gestures with his hands, which are recognized by algorithms implementing the present disclosure, and feedback may be displayed on the display screen, according to the particular gesture or movements performed by the user.

FIG. 6 is a diagram of several example gestures that can be detected by the tracking algorithms described in the present disclosure. FIGS. 7A-7D are diagrams of an additional four example gestures that can be detected by the algorithms described in the present disclosure. The arrows in the diagrams refer to movements of the fingers and hands, where the movements define the particular gesture. These examples of gestures are not intended to be restrictive. Many other types of movements and gestures can also be detected by the tracking algorithms.

Figure 8:
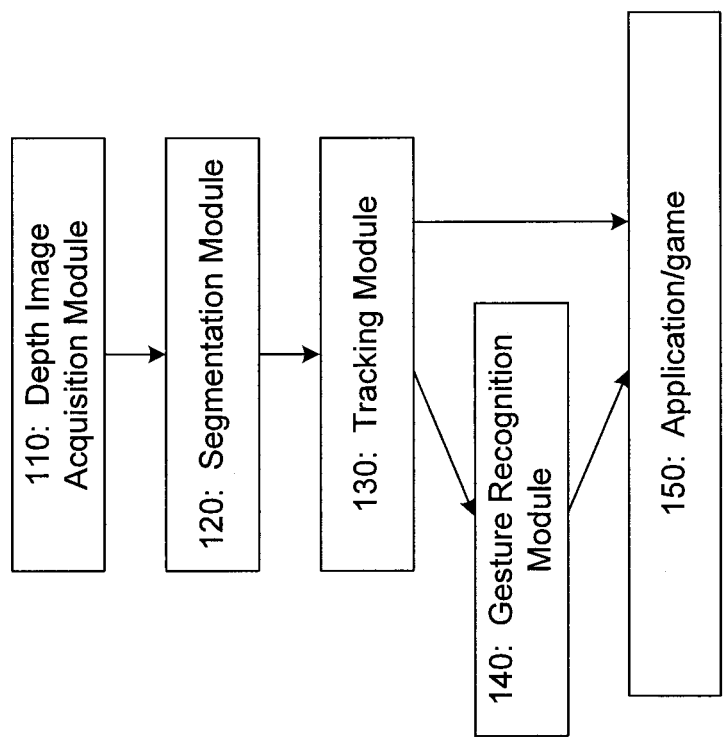
FIG. 8 is a block diagram of example components of a hand tracking system and information flow among the components.

The tracker described in the present disclosure is a part of a complete hand tracking solution. FIG. 8 shows example components of a complete hand tracking system and an example flow of information among components of the system. A sequence of depth images is generated by a depth image acquisition module 110, such as a depth camera or depth sensor. Additional types of image data may also be acquired at this stage, including RGB (red, green, blue) data and/or infrared (IR) data. Initially, each depth image map is processed and the user's hands are segmented out and separated from the rest of the image by segmentation module 120.

Figure 9:
FIG. 9 shows an example of an acquired depth image and a hand segmented from the depth image.
Figure 9:
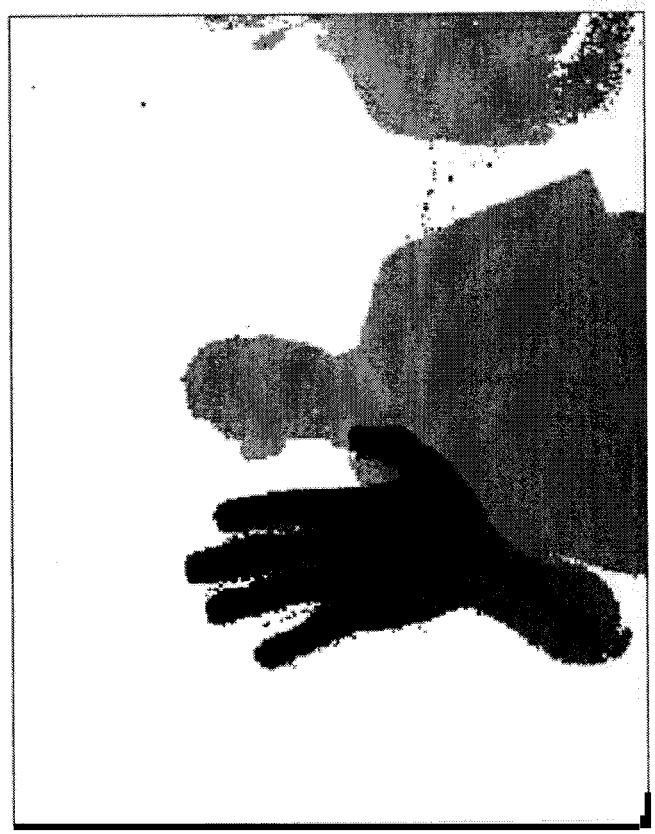

FIG. 9 displays two sample images. The image on the left is the original depth image obtained from a depth camera. Different shades of grey in the image indicate different values of the depth pixels. In this example, lighter-shaded pixels correspond to objects that are further away from the camera. The image on the right displays the hand segmented out from the rest of the image. In the segmentation module 120, each hand appearing in the depth image is segmented from the background. In particular, if there are multiple hands appearing in the depth image, each hand is segmented from the background, as well as from one another.

The results of the segmentation module 120 are transferred to the tracking module 130. The tracking module 130, described in detail in the present disclosure, uses a 3D hand skeleton model to construct multiple hypotheses for the configuration of a user's hand, and then tests these hypotheses against the data obtained from the depth image acquisition module 110. Subsequently, the results of the tracking module 130 may be used by a gesture recognition module 140, which relies on the positions and rotations of the joints over successive frames to determine whether the user has performed certain gestures. U.S. Pat. No. 7,970,176, "Method and System for Gesture Classification", and U.S. patent application Ser. No. 12/707,340, "Method and System for Gesture Recognition", disclose methods for depth camera-based gesture recognition, and are hereby incorporated in their entireties. The results of the gesture recognition module 140, and the results of the tracking module 130, may both be used by an interactive application or game 150, which, based on these results, displays contextual feedback and prompts to the user.

As used herein, a "module" includes a general purpose, dedicated or shared processor and, typically, firmware or software modules that are executed by the processor. Depending upon implementation-specific or other considerations, the module can be centralized or its functionality distributed. The module can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Figure 10:
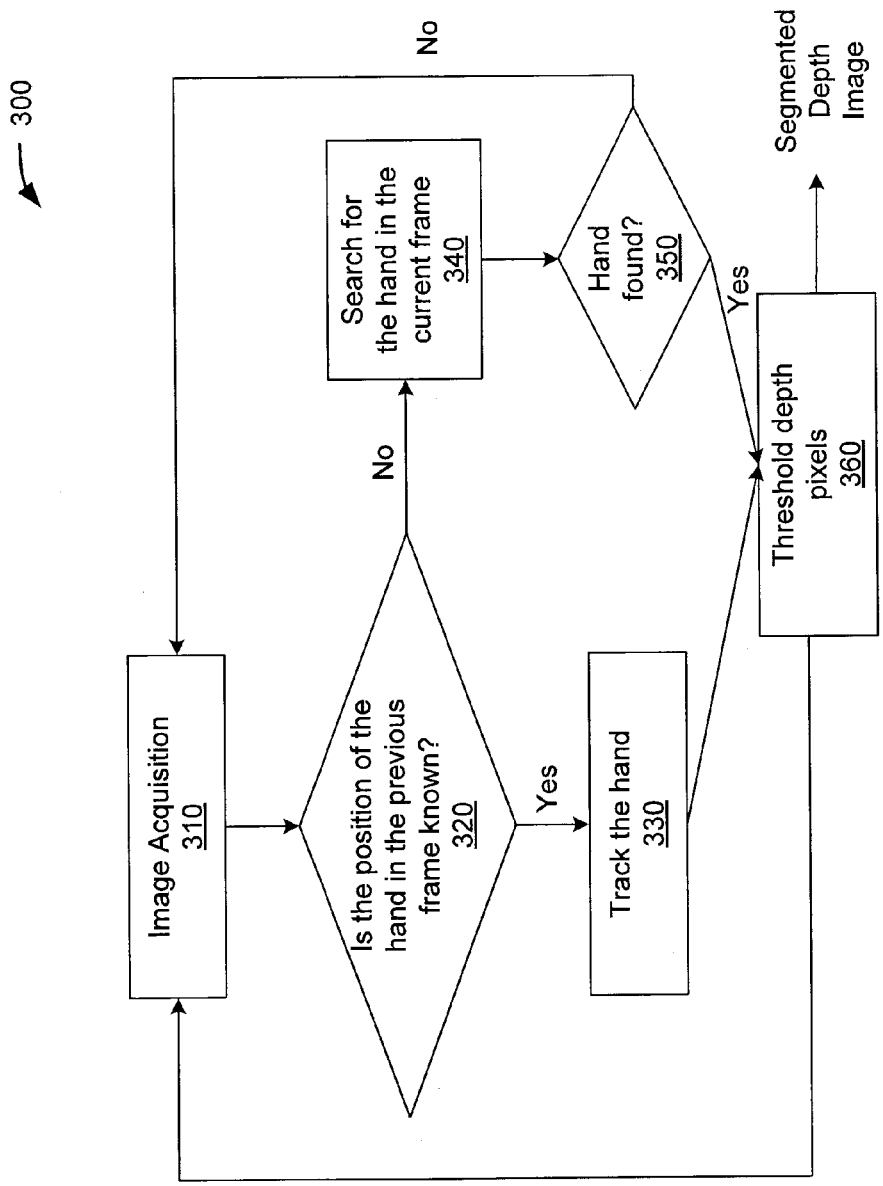
FIG. 10 is a flow diagram illustrating an example segmentation process.

FIG. 10 is a flow diagram of an example method of performing segmentation on successive depth images captured by a depth camera. At stage 310, each image captured by the depth image acquisition module 110, such as a depth camera, is transferred individually to tracker processing algorithms.

At decision stage 320, the tracker module 130 determines if the position of the hand in the previous frame of image data was known. If the position of the hand in the previous frame was not known (320—No), at stage 340, the depth image is processed to search for one or more hands. Various techniques can be used to accomplish this task. Some non-limiting examples include template matching and Haar-like feature-based classifiers (and, by extension, cascade classifiers). Alternatively, an implementation may use explicit features of the hands, such as the shapes of individual fingers, and then combine multiple individual features to recognize the hand in the image. Often, it is advantageous at this stage to combine the depth image data with RGB data, or IR data, or amplitude data, if they are available. U.S. patent application Ser. No. 13/441,271, "System and Method for Enhanced Object Tracking", describes a technique for combining depth data with amplitude data for this type of processing, and is hereby incorporated in its entirety.

At decision stage 350, the tracker module determines if any hands were found in the current frame. If one or more hands are found (350—Yes), at stage 360 thresholding of the depth image pixels is performed to segment the identified hand(s), as described more fully below. If no hands were found (350—No), the process returns to stage 310 where the system waits for the next depth image from the camera.

Returning to stage 320, if the position of the hand in the previous frame is known (320—Yes), then at stage 330 the hand is tracked in the current frame based on the previous position. There are various methods that can be implemented to track the hand. For example, tracking can be performed by matching features on the hand in the previous frame, and searching for the same features in the hand in the current frame in a region around the location of the hand in the previous frame. Methods such as scale-invariant feature transform (SIFT) and Speeded Up Robust Features (SALT), or other variants, can be used to identify and track features in this case. Alternatively, mean-shift tracking, or, similarly, ensemble tracking, can also be used.

Whether the position of the hand is determined because it was tracked from a known position in the previous frame at stage 330, or because it was initially detected at stage 340, at stage 360, the depth image is processed to discard all pixels outside of the three-dimensional volume of the hand. This may be done by computing the bounding box of the hand, and discarding, with a simple thresholding operation, all pixels that fall outside of this bounding box. The identified group of depth pixels associated with each hand in the depth image is the output of the segmentation process 300 performed by the segmentation module 120. The process then returns to stage 310 to process the next image captured by the camera.

One technique for segmenting each hand in the sequence of depth images from the image background has been discussed above. Other techniques can also be used by the segmentation module 120 to segment the hand(s) from the background. The boundaries of the hand can even be marked manually to produce the output. For the rest of this disclosure, it is assumed that the user's hands are correctly segmented out from the background of the depth images. The output of the segmentation process 300 performed by the segmentation module 120 is the group of pixels corresponding to the user's hand and is referred to herein as a "hand blob".

Figure 11:
FIG. 11 shows an example of a skinned hand skeleton model.

The present disclosure utilizes a skinned skeleton model of the hand. The model includes a skeleton and a mesh (the "skin") of the hand model. FIG. 11 shows an example of a skinned hand skeleton model. The hand skeleton model is a hierarchical graph, where the nodes of the graph represent the skeleton joints, and the edges correspond to the bones of the skeleton. Each bone of the skeleton has a fixed length and is connected to other bones by a joint, and each joint is allowed to rotate in three dimensions. The skeleton model is thus configurable and able to reproduce the movements of a human hand. Furthermore, constraints can be imposed on the rotations of the skeleton joints, to restrict the movements of the skeleton to the natural movements of the human hand.

In addition to the skeleton, the model also contains a mesh, which is a geometrical structure of vertices and associated edges, constrained to move based on the movements of the skeleton joints. In some embodiments, this mesh may be composed of polygons. In some embodiments, the individual fingers of the mesh may be composed of cylinders and spheres, modeled from polygons. However, a cylinder-based model provides only a rough approximation to the actual shape of a human hand. In some embodiments, this condition is relaxed so that the 3D model geometry more closely resembles that of a human hand. FIG. 11 is an example of a polygonal hand mesh, with an overlaid skeleton model.

The geometrical structure of the mesh is "skinned", so that movements of the mesh vertices are controlled by associated joints. There are different ways to skin the skeleton of the 3D model. In some embodiments, each vertex of the mesh can be mapped to a single joint. In some embodiments, a linear blend (or "smooth") skinning technique is employed, in which mesh vertices can be associated with multiple joints, and weights are used to represent the amount of influence each joint has on a vertex. The position of a vertex v, in a pose p, is given by:

$$v_p = \sum_{i=1}^{n} \beta_i M_{i,p} M_{i,b}^{-1} v_b$$

where the vertex v depends on n joints, $\beta_i$ are the weights of each joint i on the vertex, $v_b$ is the bind pose position of the vertex v, $M_{i,b}^{-1}$ is the transformation matrix of the local joint coordinate system for joint i, and $M_{i,p}$ is the transformation matrix (in world coordinates) for the i'th joint in pose p.

Before the skeleton model is used in the tracking component 130, it should be calibrated to the particular proportions of the user's hand(s). In the calibration phase, the lengths of the skeleton's bones are adjusted, so that the skeleton fits the data of the user's hand. During the skeleton calibration phase, there are two objectives. The first is to adjust the skeleton parameters so that they fit the user's hand. The second is to accurately compute the 3D positions of the hand joints. Generally, these two objectives can be satisfied simultaneously. However, even if the calibration computed is not exact, it may be sufficient for the purposes of the algorithm, since the lengths of the skeleton's bones may be adjusted at subsequent stages of the algorithms.

Figure 12:
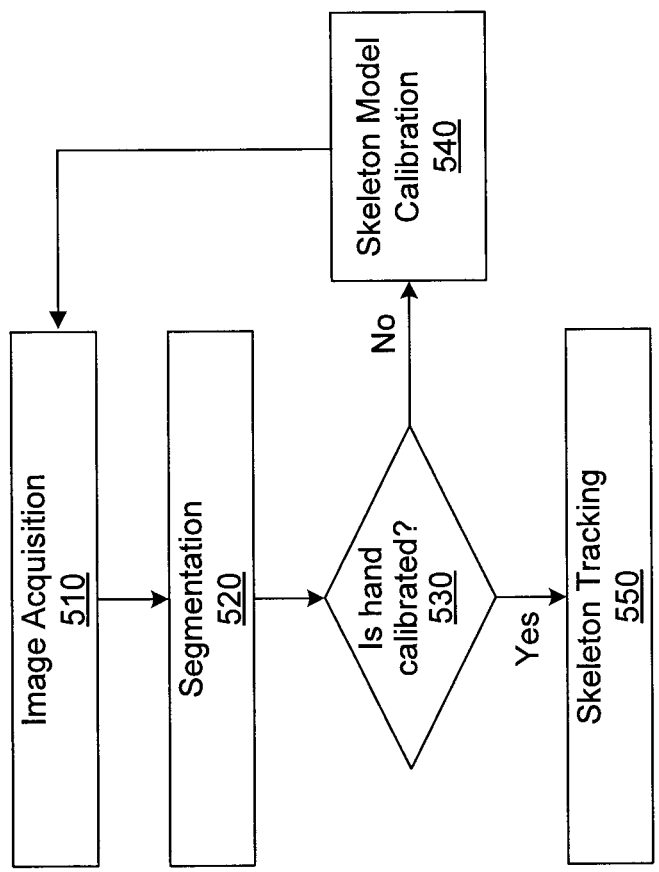
FIG. 12 is a flow diagram illustrating an example calibration process of a skeleton model.

FIG. 12 is a flow diagram illustrating an example calibration process of a skeleton model performed by the tracker module 130. At stage 510, the depth images are acquired, and at stage 520, the group of pixels corresponding to the hand (the "hand blob") is segmented out from the rest of the image.

Then at decision stage 530, the tracking component 530 determines whether the skeleton is calibrated to the user's hand. If the skeleton is not calibrated (530—No), at stage 540 calibration of the skeleton model is performed. In some embodiments, the user may be explicitly prompted to place his open hand, with fingers spread, in front of the depth camera for at least one frame, so the skeleton can be overlaid and the model parameters adjusted to the shape and size of the user's hand. In some embodiments, features of the hand are identified from the depth image, and the skeleton model is adjusted iteratively until it best matches the data obtained from the depth camera. RGB and IR images may be used in conjunction with the depth images to detect features. In both of these cases, the pose of the hand and fingers, i.e., the articulation of the skeleton joints, is also computed as part of the calibration phase at stage 540. The process returns to stage 510 for acquiring additional depth images.

If the hand has been calibrated (530—Yes), at stage 550, skeleton tracking is performed by computing the pose of the hand based on three inputs: the pose of the hand in the previous frame, as provided by the 3D hand skeleton model derived for the previous frame; the calibrated skeleton model; and the hand blob in the current frame. The output of the skeleton tracking process is the 3D hand skeleton model, and hence the full hand pose, for the current frame. The embodiments discussed above describe skeleton calibration using only a single frame. In some embodiments, the skeleton calibration occurs over multiple frames, by adjusting, for each successive frame, the model parameters based on the features detected at that frame.

As part of the hand tracking process, the tracker module 130 develops multiple model-based hypotheses. Images from the camera are analyzed to detect features. However, the features that are detected may be inaccurate, or parts of the hand may be occluded (in which case, features are not accessible). The tracker module 130 forms several hypotheses to potentially track the positions of the hand joints from the previous frame, based upon partial data obtained from the images, and then tests these hypotheses against the image data. To efficiently test the different hypotheses, the tracker module 130 applies successively finer approximations of the skeleton model to the depth data. Initially, a rough approximation of a rigid transformation between the previous and current frames is computed. Subsequently, this rigid transformation may be refined, to improve the approximation. After computing the rigid transformation, a rough approximation of the articulation of the fingers is computed. Finally, the articulation of the fingers may be refined, to increase the accuracy of the approximation.

Figure 14:
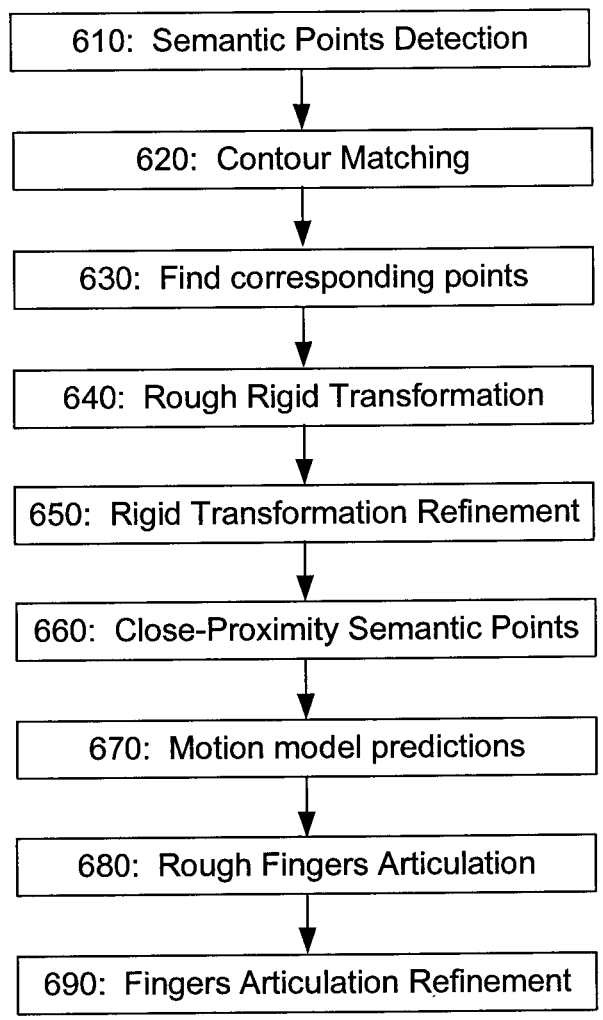
FIG. 14 is a flow diagram illustrating an example tracking process.

FIG. 14 is a flow diagram of the model-based, multiple hypothesis hand tracking process as performed by the tracker module 130. Semantic points are points in an image that correspond to known features of the hand or fingers. Examples of semantic points are pixels corresponding to specific features of the fingers, such as the fingertips. At stage 610, the tracker module 130 computes semantic points in the current frame of the depth image using image processing techniques. Any technique that is able to identify a region of the hand from the image can be used. Furthermore, these features can be extracted from the depth images, or from RGB images, or from IR images, or from any combination thereof.

In some embodiments, edges corresponding to the center axes of the fingers are detected and used to approximate individual fingers by roughly fitting a piecewise continuous line composed of up to three segments, where the three segments correspond to the three bones of a finger. In some embodiments, local maxima are detected in the depth image hand blob and used as semantic points indicating the positions of the fingertips. Local maxima are regions of the depth image where surrounding pixels have values further away from the camera than the center of the region. Local maxima correspond to features indicating, for example, fingertips pointing towards the camera, since the pixels at the periphery of the fingers are further away from the camera, i.e., they have uniformly higher depth values.

Once the features are extracted, they should be associated with a specific region of the hand, or "labeled". For example, points identified as fingertips should be labeled as specific fingers—the fingertip of the index finger, of the thumb, etc. In some embodiments of the present disclosure, machine learning algorithms are used to label the detected image features as specific parts of the hand.

In some embodiments, the training data for the labeling algorithms consists of a large set of depth images of users' hands. The semantic features of the images—joints, fingertips, etc.—are marked manually in all of the images. The semantic feature detection algorithms are applied to this set of training images, and the features that are detected by the algorithms are matched to the marked semantic features from the training set. This process results in a database of labels associated with detected semantic features. Subsequently, a feature-vector is created and associated with each finger. The feature-vectors may contain information such as the number of detected fingers in the frame, the number of fingers pointing in the same direction, the number of fingers pointing in the opposite direction, the number of fingers that are perpendicular, in clockwise order or counter-clockwise order, the finger lengths or widths, and the palm radius. A supervised learning algorithm is then applied to the training data set to generate a classifier that is able to label individual fingers, based on the detected features and the feature vectors that are constructed from them and the image data.

The semantic points computed at stage 610 are a set of positions in the current image hand blob data and their associated semantic labels.

Additionally, semantic points in the hand blob data can be generated by matching the contour of the current frame's hand blob to the contour of the hand blob of the previous frame. At stage 620, the contour of the hand blob is computed for each frame, and it is matched to the contour of the hand blob from the previous frame. The contour is the outline of the hand, that is, the pixels on the boundary of the hand. Because the contour is a set of pixels, it can be defined in either two or three dimensions, depending on whether only the spatial (x,y) coordinates of the pixels are used, or also the depth (z) values are used. In this context, only the 2D contour is used. There are standard techniques for matching two contours, any one or combination of which can be used, to determine whether they match all the pixels in the two contours, or only a subset of the contour pixels.

In a simplest case, pixels at the extremes of the hand blobs of the previous and current frames are matched. For example, the leftmost pixel from the previous frame's hand blob is matched to the leftmost pixel from the current frame's hand blob; the rightmost pixel from the previous frame's hand blob is matched to the rightmost pixel from the current frame's hand blob, etc. Alternatively, every pixel on the contour of the previous frame's hand blob is matched to a pixel on the contour of the current frame's hand blob, as described below.

Figure 15:
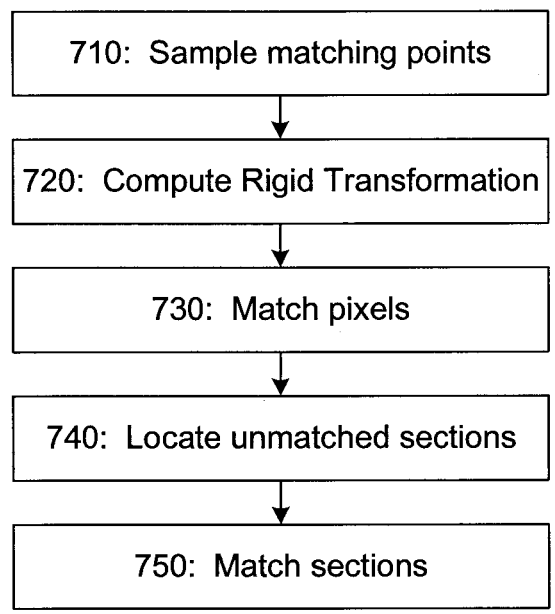
FIG. 15 is a flow diagram illustrating an example contour matching process.

A 2D point, i.e. a point that provides the spatial position (x,y coordinates) of the pixel in the image, can be written in homogeneous coordinates as a column vector with three elements (where the third element is 1). The operations of rotating, and translating the 2D point may then be represented as a 2×3 matrix. Contour matching is performed in two dimensions where a 2D contour is matched to a 2D contour in successive frames. FIG. 15 is a flow diagram illustrating an example process of blob contour matching for stage 620.

At stage 710, pairs of matching points between the previous frame's hand blob and the current frame's hand blob are computed. These initial matching points may be selected based on geometrical considerations, such as the leftmost points in each blob, the rightmost points in each blob, etc. Subsequently, a 2D rigid transformation between the hand blobs in the successive frames is computed at stage 720. The 2D rigid transformation maps the x,y coordinates for each pixel in a first frame to the x,y coordinates of another pixel in a second frame.

Then at stage 730, the points on the transformed blob contour of the previous frame and those on the contour of the current frame are matched, if the 3D positions of the points fall within a threshold of each other in the two frames. In general, most of the points are matched at this stage. However, there may be sections of the contours with large contiguous sets of unmatched points. These unmatched sections are identified at stage 740, both in the transformed blob from the previous frame, and in the blob of the current frame, and then points on each section of the contour are matched based on their ordering at stage 750. Specifically, the first point in an unmatched section of the first frame is matched to the first point in an unmatched section of the second frame, the second point in the unmatched section of the first frame is matched to the second point in the unmatched section of the second frame, etc. Returning to FIG. 14, the match between the contour of the previous frame's hand blob and the contour of the current frame's hand blob also yields semantic points. Because it is assumed that the accurate hand pose of the previous frame—and, consequently, the positions of the individual joints—is known, joints can be placed in the hand blob of the current frame at the same relative distances from the contour pixels as they were computed for the previous frame.

Based on the results of stages 610 and 620, many candidate pairs of matching semantic points are computed at stage 630, where the actual number of corresponding pairs depends on the results of stages 610 and 620 (and generally, on the particular configuration of the hand being tracked).

Three-dimensional points can be represented in homogeneous coordinates as a column vector of length four, where the first three elements are the x, y, and z components, and the fourth element is 1. A transformation of a 3D point is a mapping of said point to another 3D position. Conceptually, a transformation is analogous to translating and/or rotating the 3D point to a new position, and it may be represented in homogeneous coordinates as a 3×4 matrix. In the present disclosure, the term "rigid transformation" refers to a single transformation that is applied to the 3D positions of all of the points corresponding to the hand blob in a single frame. Once the corresponding points between the previous frame and the current frame are computed at stage 630, the objective is to find a 3D rigid transformation that best explains the transformation of the hand blob from the previous frame to the current frame.

A 2D rigid transformation was performed above for the process of contour matching where an attempt was made to match the 2D positions of pixels in success frames. Once the matches between pixels generated by the 2D transformation have been determined, the next step is to find a 3D transformation that best fits the matches between the pixels (i.e., the movement of the pixels between frames). The 3D transformation is "rigid" in the sense that independent movements of small groups of pixels in the sets are ignored. Further, it is assumed that the movements of the entire set of pixels with a single transformation can be explained sufficiently well, i.e., the set of pixels all move together, which is, in general, not true, but is adequate for a first approximation if the movements are small. The 3D rigid transformation is computed in two stages.

First, the set of corresponding points is sampled to yield triplets of corresponding points at stage 640, that is, three pairs of matching points. A triplet of corresponding points is sufficient to compute the 3D rigid transformation of the hand blob from the previous frame to the current frame. In general, the set of corresponding points computed in the previous steps contains far more than three pairs of matching points, so many candidate rigid transformations, or hypotheses, can be generated. Each candidate rigid transformation (hypothesis) is applied to the hand skeleton model from the previous frame. Then, the model is rendered to produce a depth map. The similarity between this rendered depth map and the depth map generated by the depth camera indicates the validity of the hypothesis which is being tested. However, the data generated by the depth camera is typically noisy, and can also contain systematic distortions of the data. To measure the similarity between the generated rendered model and the data generated by the depth camera, an objective function is used, which is designed to minimize the systematic errors in the camera data, and emphasize the reliable aspects of the data. The transformation yielding the minimum value of the objective function is selected.

Generally, the objective function should measure the similarity between the synthesized image and the depth data of the hand blob. Any function that measures this discrepancy can be used. In some embodiments of the present disclosure, the objective function includes a component that measures the size of the overlapping region between the synthesized image and the segmented hand in the camera's image. In some embodiments, the objective function also includes a component that computes the fit of the rendered hand skeleton model to the hand blob data in the current frame. Fit refers to how precisely the synthesized image, i.e., the rendered skinned hand skeleton, matches the camera data. In some embodiments, the objective function also includes a component that measures the distance between the contours of the rendered hand skeleton model and the contours of the hand blob data in the current frame. In some embodiments, the objective function also includes a component that measures the smoothness of the joints' motion over time.

If I is the group of, pixels corresponding to the hand blob in the current image, and $\tilde{I}$ is the synthetic hand blob generated by rendering the skinned hand skeleton model, then the objective function may be expressed as a sum of distinct metrics, in the form of:

$$F(I, \tilde{I}) = \sum_{i=1}^{n} \alpha_i D_i(I, \tilde{I})$$

where $\alpha_i$ for i=1, ..., n are the weights of the distinct metrics, and $D_i(I,\tilde{I})$ for i=1, ..., n are the metrics representing the differences between the synthetic data and the data from the camera. In some embodiments of the present disclosure, $D_1(I, \tilde{I})$ is the size of the overlapping region between the synthesized image and the camera's image, $D_2(I,\tilde{I})$ measures the fit of the rendered hand model to the hand blob data, $D_3(I,\tilde{I})$ measures the distance between the contours of the rendered hand model to the hand blob data, and $D_4(I,\tilde{I})$ measures the smoothness of the joints' motion over time. The hypothesis that yields the minimum value of the objective function will be chosen as the computation of the hand pose that most closely fits the data captured by the camera.

Figure 13:
FIG. 13 shows an example of a depth image with a visible shadow effect.

In this way, the best match, as determined by the objective function, between the synthesized, rendered data and the camera depth data is selected. However, the accuracy of the camera data may be degraded due to systematic errors caused by the camera design. For example, triangulation-based solutions, including structured light and active stereo technologies, produce depth images with shadows on the regions of an object that are not visible both to the camera's sensor and the camera's projector. Consequently, there is missing data on occluded regions of objects in the scene. The effect of such an artifact is a shadow-like region in the image, corresponding to missing data on the occluded object, with the same general shape as the foreground object. While the shadow effect is characteristic of triangulation-based systems, this effect may also occur in TOF-based or other depth computation technologies, especially if the illumination source is relatively far from the sensor. FIG. 13 is an example of a depth image of a user with both hands open towards the depth camera. Because the left hand, which is closer to the camera, is occluding the right hand, which is further away from the camera, there is a shadow effect 582 visible on the right hand. Similarly, there is also a shadow effect 584 on the user's body, caused by the occlusion of the right hand.

In some embodiments, the shadow effect is modeled in the rendering of the synthetic depth images, with the result that the rendered (synthetic) depth images also contain these shadow effects, and therefore resemble more closely the camera data at each frame. In particular, the synthetic hand skeleton model is rendered with an illumination source set at the same relative position from the virtual camera as the depth camera projector is positioned relative to the depth camera's image sensor. Initially, the illumination source is projected onto the scene containing one or more hand skeleton models, and, subsequently, only those regions of the hand skeleton model(s) that were sufficiently illuminated are rendered, to generate the synthetic depth image. Using this technique for modeling the shadow effects, the methods described in the present disclosure are able to accurately track the hand configurations, even in the presence of such shadow effects.

Returning to FIG. 14, at stage 650, the parameters of the selected rigid transformation are jittered randomly, with the goal of improving the accuracy of the rigid transformation. As is well known in the field of computer graphics, in three dimensions, the transformation matrix is the result of a matrix multiplication of a rotation matrix and a translation vector, which yields a 3×4 matrix with 12 values. Thus, the 12 values of the transformation matrix are randomly jittered in an attempt to improve the accuracy of the transformation matrix. For each of these random variations of the transformation parameters applied to the hand skeleton model and rendered, the objective function is evaluated, and, again, the transformation yielding the minimum value of the objective function is selected.

At this point, it is assumed that a single rigid transformation describing the global translation and rotation of the hand from the previous frame to the current frame has been computed. This rigid transformation, when applied to the hand skeleton of the previous frame, should yield a good initial approximation to the hand pose in the current frame. However, this may not be the final rigid transformation, as the parameters of the rigid transformation may be adjusted at subsequent stages of the algorithm. Notwithstanding this possibility, the focus now shifts to computation of the finger articulations, that is, the local rotations of the joints of the fingers. To compute these finger articulations, corresponding points between the previous frame and the current frame are again used. Moreover, the computation of the rigid transformation provides an additional method for computing semantic points in the image, as described below.

For computing the finger articulations, the tracker module 130 again proposes different hypotheses to explain the hand configuration as represented in the depth image data, and then tests the different hypotheses against the image data. The hypotheses take the form of sets of candidate joint positions.

Some of these candidate joint positions are taken from the semantic points detected at stage 610 and the contour matching at stage 620.

In addition, once the initial rigid transformation has been computed, it is applied to the hand skeleton model from the previous frame, and the resulting configuration is rendered as a depth map. Some of the semantic points that were computed either in the semantic points detection performed at stage 610 or the contour matching performed at stage 620 may not have received a label. If any of these semantic points are within a pre-defined radius of the joint locations in the rendered, transformed hand model, these points are also designated as candidate joint positions or semantic points at stage 660.

A further source of candidate joint positions is obtained by applying a motion model to the last known positions of each joint in a set of previous frames at stage 670. In some embodiments, the motion model may be a simple linear function of the 3D positions in a set of previous frames. In some embodiments, the motion model can be a higher-order polynomial function, or a spline, or other functions. The motion model is applied to each joint, based on their known positions in a set of previous frames, and the joint positions generated by the motion model are added to the set of candidate joint positions.

To summarize, some embodiments of the present disclosure assemble a list of candidate joint positions from four sources: semantic points detected on the blob of the current frame, points matched to known positions in the previous frame, semantic points in close proximity to the rendered, transformed skeleton of the previous frame (using the rigid transformation computed at stage 650), and points obtained from the individual joints motion model. Any other method that yields candidate joint positions for the joints of the hand may also be used. Once the list of candidate joint positions has been assembled, subsets of possible joint configurations for the entire hand skeleton are sampled from the larger set at stage 680. For each sampled subset, a configuration for the entire hand skeleton is computed and a depth image is rendered. The objective function is then used to test the different hypotheses, and the set of joint positions that minimizes the value of the objective function is selected.

A key aspect of the present disclosure is the use of semantic points to compute the corresponding features between the previous and current frames. Reliance on semantic information accelerates the convergence of the algorithms to the correct hand configurations, and enforces a consistency constraint, by matching the computed hand configurations to the features that are extracted from the camera data for each frame. In this way, the present disclosure effectively merges an initialization stage into the regular tracking component, matching the computed hand configuration to the data extracted at each frame. The benefit of incorporating an implicit initialization into the tracking component is that it obviates the need for explicit initialization, and prevents the error drift characteristic of such trackers, which is caused by the cumulative effect of single frame errors over multiple successive frames.

In a manner similar to that used by the rigid transformation refinement performed at stage 650, the 3D positions of each of the joints computed at stage 680, as well as the parameters of the rigid transformation, may be jittered randomly, and the new positions can also be similarly evaluated with the objective function, to find the optimal value of the joint positions at stage 690. Finally, the resulting hand skeleton model pose is generated from the positions of the joints and is the output of the tracker module 130.

In some embodiments, a gradient descent algorithm is applied per joint to find the minima of the objective function, and thereby further improve the accuracy of the estimation. Similarly, other gradient-based methods can be used to find the minimum of the objective function.

Figure 16:
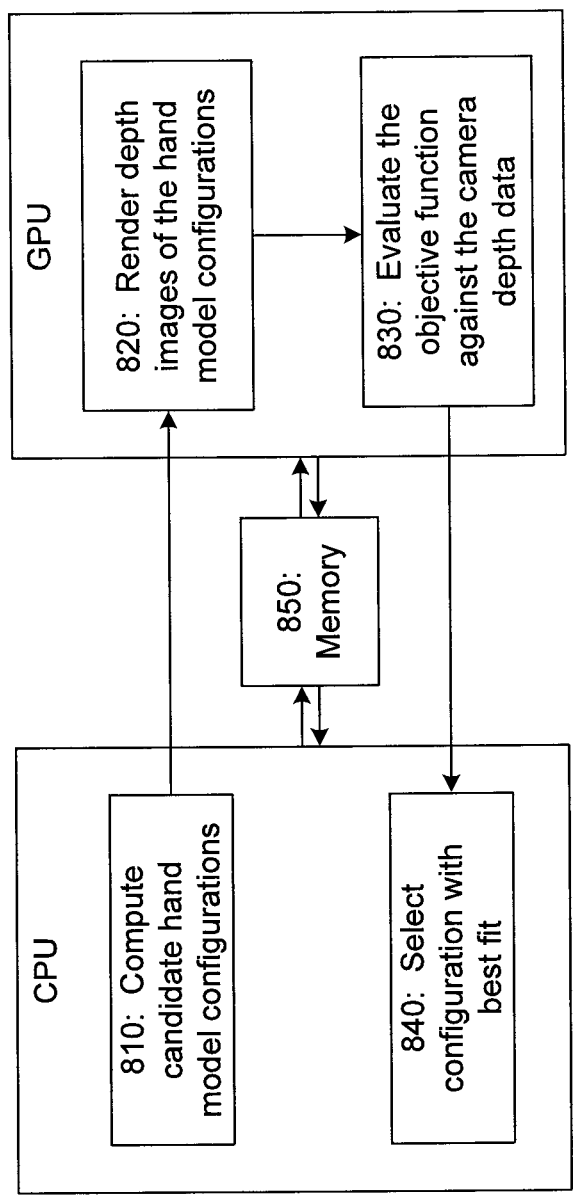
FIG. 16 shows an exemplary architecture for the tracker module.

FIG. 16 is a diagram illustrating example components of the tracker module 130 that may be distributed over different processor architectures to maximize performance. The computations performed in the evaluation of the hypotheses (including the computation of the objective function for different hypotheses) benefit from standard stream processing paradigms, such as graphics processing units (GPU). In particular, many configurations of the hand skeleton model need to be rendered as depth maps, and then evaluated pixelwise against the hand blob data captured by the depth camera. Both of these functions are well served by the highly parallel architecture of the GPU. Consequently, once the candidate hand model configurations are computed on the central processing unit (CPU) 810, the models are rendered on the GPU 820, and then the objective function is evaluated on the GPU as well 830. Results of the objective function evaluation are transferred back to the CPU, where the configuration yielding the minimum value of the objective function is selected 840.

The techniques described in the present disclosure may be similarly applied to the case in which there are multiple hands appearing simultaneously in the captured data stream. Even more generally, the techniques described above are applicable to tracking movements of any other body part(s) and/or an entire body of one or more persons or animals. In each of these cases, an appropriate skeleton model for each tracked body or body part is used. The techniques may even be applicable to tracking the movements of objects, where movement ranges of objects or parts of the object are known so that an equivalent 'skeleton' model can be generated for each object.

Figure 17:
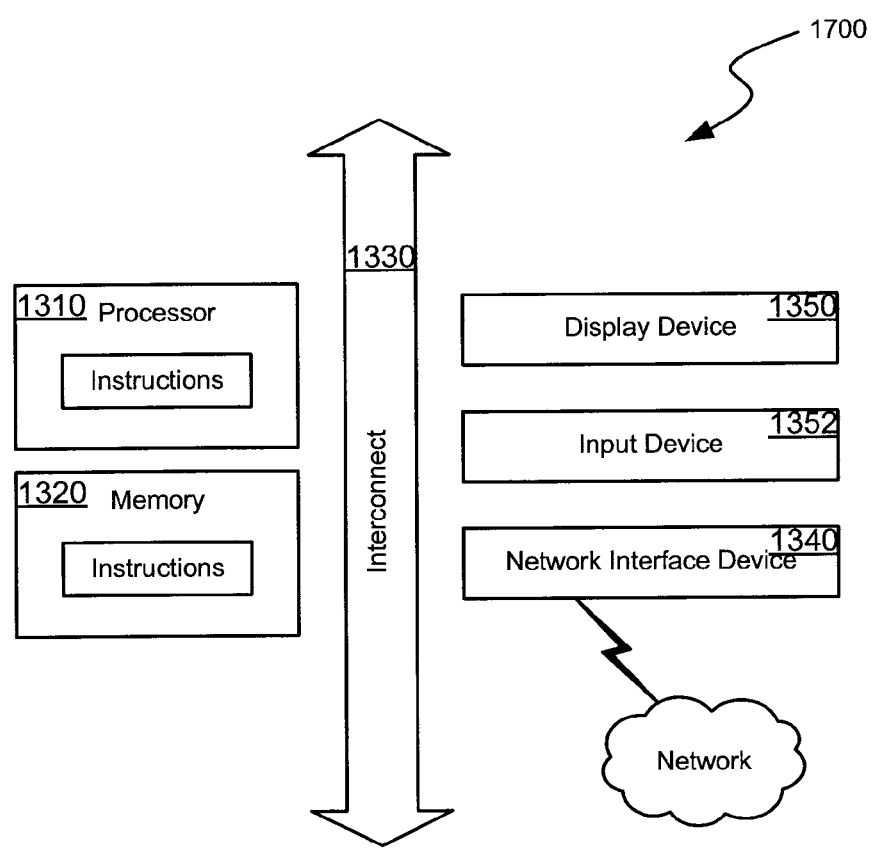
FIG. 17 is a block diagram showing an example of the architecture for a processing system that can be utilized to implement tracking techniques according to an embodiment of the present disclosure.

FIG. 17 is a block diagram showing an example of the architecture for a system 1700 that can be utilized to implement the techniques described herein. In FIG. 17, the system 1700 includes one or more processors 1310 and memory 1320 connected via an interconnect 1330. The interconnect 1330 is an abstraction that represents any one or more separate physical buses, point to point connections, or both connected by appropriate bridges, adapters, or controllers. The interconnect 1330, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 1310 can include central processing units (CPUs) and graphical processing units (GPUs) that can execute software or firmware stored in memory 1320. The processor(s) 1310 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 1320 represents any form of memory, such as random access memory (RAM), read-only memory (ROM), flash memory, or a combination of such devices. In use, the memory 1320 can contain, among other things, a set of machine instructions which, when executed by processor 1310, causes the processor 1310 to perform operations to implement embodiments of the present invention.

Also connected to the processor(s) 1310 through the interconnect 1330 is a network interface device 1340. The network interface device 1340 provides the system 1700 with the ability to communicate with remote devices, such as remote depth cameras or devices to be controlled, and may be, for example, an Ethernet adapter or Fiber Channel adapter.

The system 1700 can also include one or more optional input devices 1352 and/or optional display devices 1350. Input devices 1352 can include a keyboard. The display device 1350 can include a cathode ray tube (CRT), liquid crystal display (LCD), or some other applicable known or convenient display device.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference in their entireties. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

The invention claimed is:

1. A method for tracking a target in a sequence of depth images, the method comprising:
   acquiring with a depth sensor the sequence of depth images;
   formulating multiple hypotheses for a target configuration in a selected depth image of the sequence of depth images, wherein each of the multiple hypotheses includes a set of corresponding points between a known target configuration in a previous depth image in the sequence of depth images and the target configuration in the selected depth image;
   using a target skeleton model, synthesizing a depth map of the target configuration in the selected depth image for each of the multiple hypotheses;
   testing each hypothesis by comparing the respective synthesized depth map to the selected depth image to identify a best hypothesis that most closely fits the target configuration in the selected depth image;
   identifying semantic points of the target in the selected depth image;
   computing a rigid transformation of the target from the previous depth image to the selected depth image using at least a subset of the semantic points;
   randomly jittering parameters of the computed rigid transformation to generate additional hypotheses for testing;
   testing each additional hypothesis to identify an improved best hypothesis that fits the target configuration in the selected depth image at least as well as the best hypothesis.

2. The method of claim 1, wherein testing each hypothesis comprises evaluating an objective function for each hypothesis, wherein the objective function measures a similarity between a given synthesized depth image and the depth image data for the target configuration in the selected depth image.

3. The method of claim 2, wherein the objective function includes a component that computes a size of an overlapping region between the given synthesized depth map and the depth image data for the target configuration in the selected depth image.

4. The method of claim 2, wherein the objective function includes a component that computes a fit of the synthesized depth map to the depth image data for the target configuration in the selected depth image.

5. The method of claim 2, wherein the objective function includes a component that computes a distance between contours of the synthesized depth map and the depth image data for the target configuration in the selected depth image.

6. The method of claim 2, wherein the objective function includes a component that determines a smoothness of joints of the target over time.

7. The method of claim 1, further comprising:
subsequent to computing the rigid transformation of the target, computing finer articulations of the target.

8. The method of claim 7, wherein the target is a user's hand, and the finer articulations are finger articulations, and further comprising identifying a gesture from the computed rigid transformation and finger articulations.

9. The method of claim 7, wherein the target is a user's hand, and the finer articulations are finger articulations, and further comprising transmitting the computed rigid transformation and finger articulations to an application configured to allow the user to interact with an electronic device.

10. The method of claim 7, further comprising:
based on the computed rigid transformation, identifying additional semantic points of the target for computing the finer articulations of the target.

11. The method of claim 7, wherein the identified semantic points implicitly initializes the target skeleton model for each image in the sequence of depth images.

12. The method of claim 7, wherein the identified semantic points implicitly implements error corrections for the target skeleton model computed for each image in the sequence of depth images.

13. The method of claim 1, wherein synthesizing a depth map of the target configuration comprises: generating a skinned target skeleton model configured to the set of corresponding points, and rendering the model to generate a depth map.

14. The method of claim 13, wherein rendering the model includes using an illumination source to model shadow effects.

15. A method for tracking a user's hand in a sequence of depth images, the method comprising:
acquiring with a depth sensor the sequence of depth images, wherein the sequence of depth images includes a preceding depth image and current depth image;
calibrating a hand skeleton model to the hand;
segmenting the hand in the current depth image from a rest of the depth image;
determining a current hand pose for the current depth image based on a known pose of the hand in the preceding depth image, the calibrated hand skeleton model, and the segmented hand in the current depth image;
identifying semantic points of the hand in the current depth image;
computing candidate rigid transformations of the hand from the preceding depth image to the current depth image using at least a subset of the semantic points;
randomly jittering parameters of the candidate rigid transformation to refine the rigid transformation; and
testing each hypothesis to identify an improved best hypothesis that fits the target configuration in the selected depth image at least as well as the best hypothesis.

16. The method of claim 15, wherein determining a current hand pose for the current depth image comprises:
applying each candidate rigid transformation to the hand skeleton model for the hand in the preceding depth image and determining which candidate rigid transformation most closely matches the current depth image to identify a best rigid transformation.

17. The method of claim 16, wherein determining a current hand pose for the current depth image further comprises:
computing candidate finger articulations of the hand;
applying each candidate finger articulations to the hand skeleton model for the hand in the preceding depth image and determining which candidate finger articulations most closely matches the current depth image to identify a best finger articulations.

18. The method of claim 15, wherein the hand skeleton model is rendered using an illumination source to model shadow effects.

19. A system of tracking a hand in a sequence of depth images, the system comprising:
a depth sensing module configured to acquire a sequence of depth images of a hand;
a tracking module including at least one central processing unit (CPU) to track movements of the hand in the sequence of depth images, wherein tracking movements comprises:
identifying multiple hypotheses for hand configurations in a current depth image; rendering a skeleton model of the hand for each of the multiple hypotheses;
applying an objective function used to identify a best hypothesis that most closely fits the hand configuration in the current depth image
identifying semantic points of the hand in the current depth image;
computing a rigid transformation of the target from the previous depth image to the selected current depth image using at least a subset of the semantic points;
randomly jittering parameters of the computed rigid transformation to generate additional hypotheses for testing; and
testing each additional hypothesis to identify an improved best hypothesis that fits the target configuration in the selected depth image at least as well as the best hypothesis.

20. The system of claim 19, wherein the tracker module computes candidate hand model configurations corresponding to each of the multiple hypotheses, and further wherein the tracking module includes at least one graphical processing unit to render the skeleton models and apply the objective function for each of the skeleton models, wherein results of the objective function application are used by the CPU to select a hypothesis and corresponding hand configuration that yields an optimum value for the objective function.

21. The system of claim 19, further comprising a segmentation module configured to segment out the hand in the current depth image from a rest of the current depth image.

22. The system of claim 19, further comprising a gesture recognition module configured to identify one or more gestures from the tracked movements of the hand.

23. The system of claim 19, wherein rendering the skeleton model includes using an illumination source to model shadow effects.

24. A system for tracking a target in a sequence of depth images, the method comprising:
a depth image module to acquire the sequence of depth images;
a central processing unit (CPU); and a tracking module coupled to the CPU to track movements of the target in the sequence of depth images, wherein tracking movements comprises:

formulating multiple hypotheses for a target configuration in a selected depth image of the sequence of depth images, wherein each of the multiple hypotheses includes a set of corresponding points between a known target configuration in a previous depth image in the sequence of depth images and the target configuration in the selected depth image;

synthesizing a depth map of the target configuration in the selected depth image for each of the multiple hypotheses;

testing each hypothesis by comparing the respective synthesized depth map to the selected depth image to identify a best hypothesis that most closely fits the target configuration in the selected depth image;

identify semantic points of the target in the selected depth image;

compute a rigid transformation of the target from the previous depth image to the selected depth image using at least a subset of the semantic points;

randomly jitter parameters of the computed rigid transformation to generate additional hypotheses for testing; and test each additional hypothesis to identify an improved best hypothesis that fits the target configuration in the selected depth image at least as well as the best hypothesis.

25. The system of claim 24, wherein testing each hypothesis comprises evaluating an objective function for each hypothesis, wherein the objective function measures a similarity between a given synthesized depth image and the depth image data for the target configuration in the selected depth image.

* * * * *